United States Patent
Haas et al.

[11] Patent Number: 6,129,359
[45] Date of Patent: Oct. 10, 2000

[54] SEALING ASSEMBLY FOR SEALING A PORT AND THE LIKE

[75] Inventors: Jon W. Haas; Charles W. Haupt, both of Littleton, Colo.

[73] Assignee: Lockheed Martin Corporation, Bethesda, Md.

[21] Appl. No.: 09/300,561

[22] Filed: Apr. 27, 1999

[51] Int. Cl.[7] ........................................... F16J 15/14
[52] U.S. Cl. ................ 277/590; 277/614; 277/616; 277/637
[58] Field of Search ................................... 277/590, 616, 277/619, 637, 650, 627, 614; 285/917

[56] References Cited

U.S. PATENT DOCUMENTS

| | | |
|---|---|---|
| 3,989,285 | 11/1976 | Yancey . |
| 4,084,602 | 4/1978 | Cook . |
| 4,616,860 | 10/1986 | Faria et al. . |
| 4,950,002 | 8/1990 | Hormansdorfer . |
| 4,988,130 | 1/1991 | Obara et al. . |
| 5,251,941 | 10/1993 | McGarvey ........................ 277/614 X |
| 5,433,454 | 7/1995 | Ramberg . |
| 5,782,500 | 7/1998 | Mate . |
| 5,803,507 | 9/1998 | Vu . |

Primary Examiner—Lynne H. Browne
Assistant Examiner—William L. Miller
Attorney, Agent, or Firm—Louis L. Dachs

[57] ABSTRACT

The sealing assembly for a port of a valve or the like is disclosed. In detail, the sealing assembly includes the port having a circular shaped end with a circular shaped knife-edge thereon. The sealing assembly further includes a hollow cap having a closed first end with an aperture therethrough and an open second end. The cap further includes internal threads adapted to mate with the external threads of the port. A gasket is mounted within the cap having flat first and second principle sides and made of a deformable metal, the first principle side of the gasket for mounting against the circular shaped knife edge of the port. A plunger having a circular shaped disc portion is adapted to fit within the hollow cap and is engagable with the first principle surface of the gasket and includes a shaft portion extending out of the aperture. The cap and shaft of the plunger include external wrenching flats. Thus when the cap is screwed onto the port and the plunger is prevented from rotating by a wrench mounted on the wrenching flats of the shaft portion of the plunger, the gasket is forced into engagement with the knife edge in pure compression and no rotation of the gasket occurs causing the knife edge to locally deform the gasket sealing of the port.

6 Claims, 2 Drawing Sheets

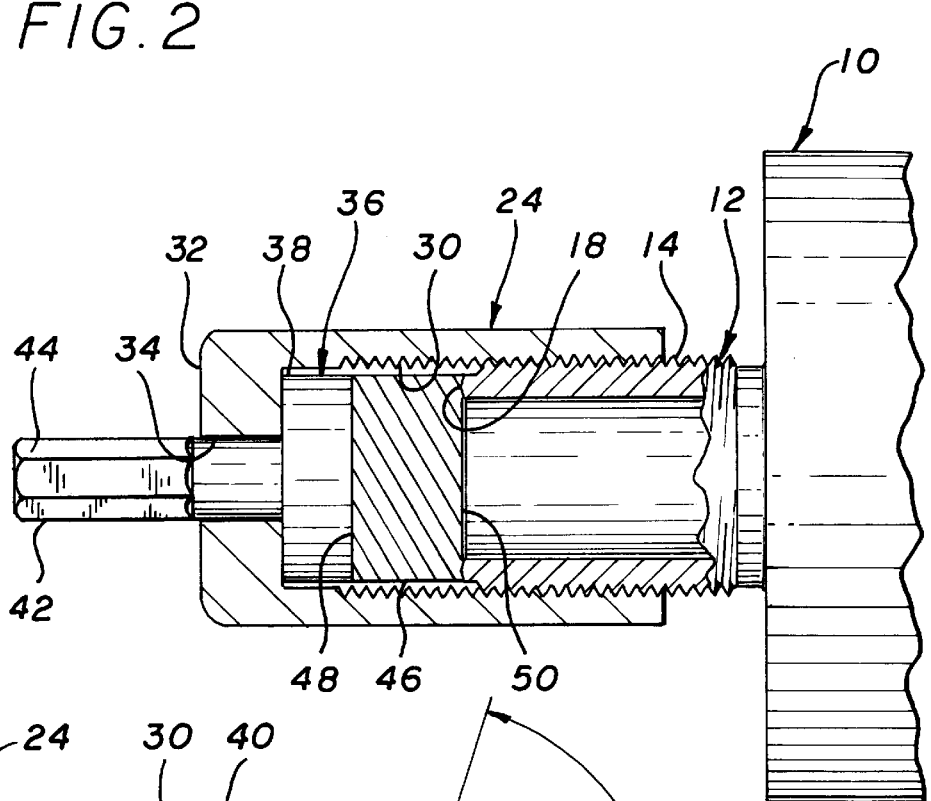
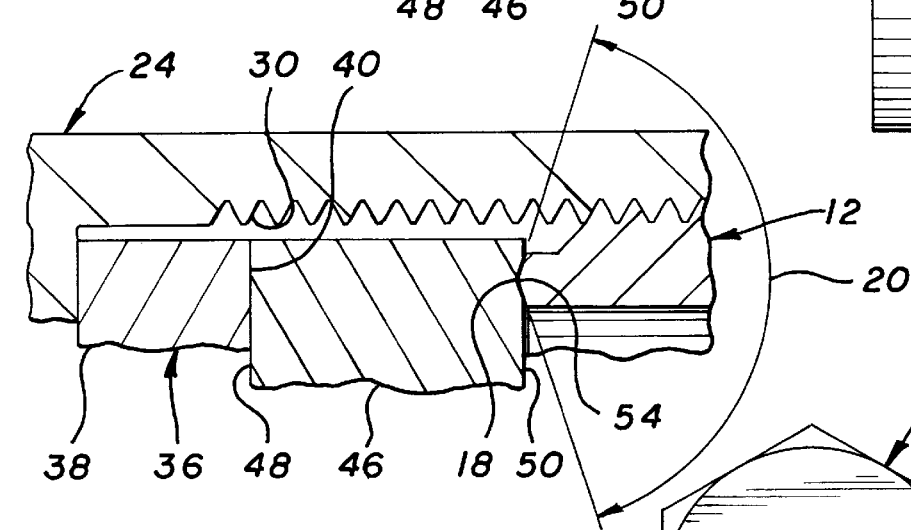
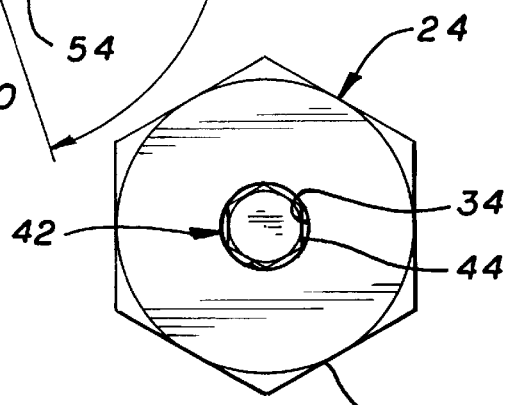

SEALING ASSEMBLY FOR SEALING A PORT AND THE LIKE

The US Government has rights in the present invention in accordance with the Contract awarded by the National Aeronautics and Space Administration.

BACKGROUND OF THE INVENTION

1. Field of the Invention

The invention relates to the field of sealing systems for inlet or outlet ports of valves, such as Schrader-type valves and the like and, in particular, to an all metal sealing assembly that provides for a sealing gasket to seated about the periphery of the port by the application of only a compression load.

2. Description of Related Art

Satellites in orbit and deep space probes must often operate for years on limited supplies of fuel and other pressurized liquids and gases. Thus providing zero or extremely low leakage rates on system components thereof such as valves, lines and tanks is a necessity. This is particularly important for the valves used to fill tanks. Port sealing assemblies using elastomeric seals such as O-rings often prove unacceptable because they deteriorate over a long period of time especially in a space environment. In addition, when the tank contains a gas such as Hydrogen or Helium, they will slowly migrate through elastomeric seals. Such a leakage rate, which would be ignored on a ground based tank or on an aircraft, is unacceptable on a satellite or space probe where a fixed supply of gas must last up to fourteen years.

Metal to metal seals are preferred for use with such applications, for example, metal O-rings and the like. However, these require mating surfaces with very fine finishes. Another standard fitting design incorporates a male conical sealing surface on the port, which includes external treads. A hollow cap having a closed first end with an aperture therethrough and an open second end. The cap further includes internal threads adapted to mate with the external threads of the port and external wrenching flats. A plunger having a circular head portion with a female conical sealing surface is adapted to fit within the hollow cap and includes a shaft portion extending out of the aperture. A conical shaped gasket made of soft metal, usually copper or sometimes silver plated nickel, is positioned between the two sealing surfaces. When the cap is tightened, the gasket forms a seal. However, while this fitting is reusable, it depends upon the friction between the gasket and the conical surfaces to prevent rotation of the plunger or gasket. In addition, it depends upon highly polished sealing surfaces.

To eliminate the need for such super fine fines, knife-edge seals are used that create high-localized loads on the gasket. For example, U.S. Pat. No. 4,988,130 "Metal Seal Flange Assembly" by K. Obara, et al. discloses a bolted flange joint wherein a metal ring shaped gasket made of copper is sandwiched between two flanges having circular knife-edges. When the flanges are bolted together, the knife-edges locally deform the gasket creating a highly stressed joint at the knife-edge to gasket interface. This improves the seal's effectiveness. However, the dissimilar metals (flanges versus gaskets) can lead to leakage when used in extreme environments. For example, at cryogenic temperatures, the greater shrinkage of a copper gasket used with steel flanges can lead to relaxation of the joint.

On circular shaped ports that have screw-on caps, a soft metal gasket, typically made of lead or copper, is installed in the cap. When the cap is torqued down, the peripheral edge of the port acting locally deforms the gasket forming a seal. However, the combination of surface shear and compression loading on the gasket can cause micro-sized leakage paths. This is especially true if the gasket has even minor imperfections to start with. Furthermore, in standard applications of this sort wherein the gasket is often a washer (has a hole in the middle) there exists a second potential leak path.

Thus, it is a primary object of the invention to provide a sealing assembly for a port that has extremely low leakage rates.

It is another primary object of the invention to provide a sealing assembly for a port that uses metal sealing gaskets.

It is a further object of the invention to provide a sealing assembly for a port that uses metal sealing gaskets that engage a knife-edge located on the periphery of the port.

It is a still further object of the invention to provide a sealing assembly for a port that uses metal sealing gaskets that engage a knife edge located on the periphery of the port that prevents rotation of the gasket as it seals against the knife edge on the port.

It is an additional object of the invention to provide a sealing assembly that employs similar metals to mitigate the effects of extreme temperatures.

SUMMARY OF THE INVENTION

The invention is a sealing assembly for a port of a valve or the like. In detail, the invention includes the port having a circular shaped end with a circular knife-edge at. The sealing assembly further includes a hollow cap having a closed off first end with an aperture therethrough and an open second end, the cap having internal threads adapted to mate with the external threads of the port. A gasket, made of a malleable metal, is mounted within the cap having flat first and second principle sides the first principle side of the gasket having engagable with the circular shaped knife edge of the port at the sealing surface. A plunger having a circular head portion is adapted to fit within the hollow cap with one side thereof engagable with the second principle side of the gasket. The opposite side of the disc includes a shaft portion extending out of the cap's aperture. The cap and shaft of the plunger include external wrenching flats.

Thus when the cap is screwed onto the port and the plunger is prevented from rotating by a wrench, the gasket is forced into engagement with the knife edge in pure compression causing the knife-edge to locally deform the gasket sealing off the port with no rotation of the gasket occuring relative to the sealing surface. Preferably, the cap and plunger are made of a high strength alloy, such as an Aluminum alloy. The gasket is preferably made of a softer Aluminum or Aluminum alloy. With all the components made of generally the same material; changes in temperature will not cause differential thermal expansion and, thus will have little effect on the seal. This would particular be true if the port where also made of the same materials as the cap and plunger.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 2 is a cross-sectional view of the sealing assembly.

FIG. 3 is an end view of the sealing assembly illustrated in FIG. 2 FIG. 4 is an enlarged view of a portion of the sealing assembly shown in FIG. 2 particularly illustrating the knife-edge to gasket seal.

DESCRIPTION OF THE PREFERRED EMBODIMENT

Figure 1:
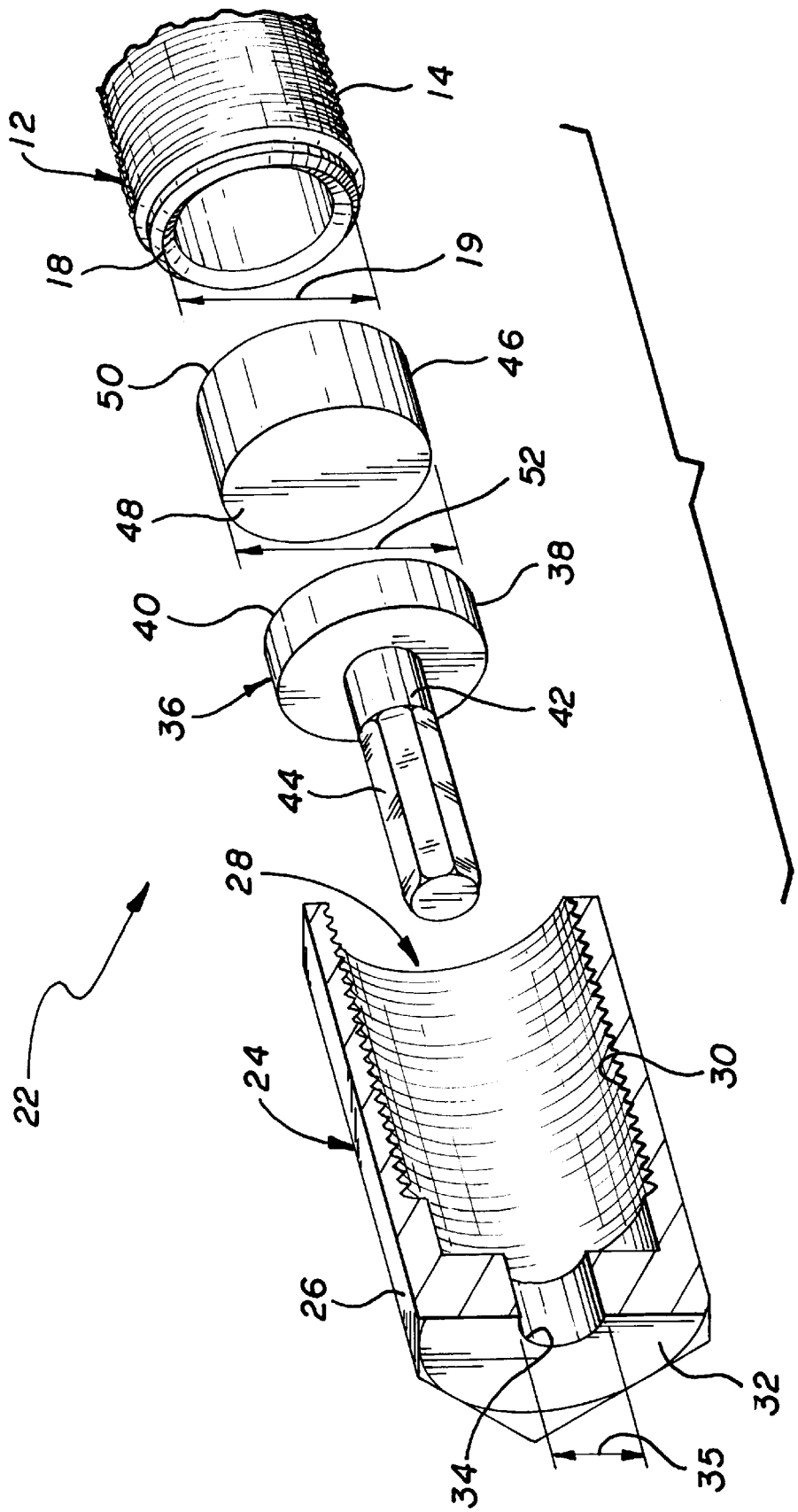
FIG. 1 is an exploded perspective view of the sealing assembly.

Referring to FIGS. 1–4, a valve 10, for example a Schrader valve used for filling a Helium tank (not shown) on a deep space probe, is illustrated and which includes a fill port 12. The port 12 includes external threads 14 and a circular peripheral edge 16 having a knife-edge 18 with an included angle 20 of generally between 140 and 160 degrees. Preferably, the included angle 20 is around 150 degrees. The diameter of the knife-edge 18 is indicated by numeral 19. When used to fill the tank, a line (not shown) would be attached to the port 12 that engages the Schrader valve causing it to open. After filling of the tank has been accomplished, the line would be removed and the subject sealing assembly, generally indicated by numeral 22, would be attached to the port 12. While a Schrader valve is mentioned for purposes of illustration and discussion, the subject sealing assembly 22 could be used other types of valves, or on ports in general.

The sealing assembly 22 comprises a hollow cup shaped cap 24 having an external hexagon shaped surface 26 that serve as wrenching flats and an internal bore 28 with internal threads 30 adapted to mate with the external threads 14 on the port 12. The cap 24 further includes an end wall 32 having an aperture 34 therethrough with a diameter indicated by 35. A plunger 36 is mounted within the bore 28 having a disc shaped member 38 having a flat surface 40. The plunger 36 further includes a stem portion 42 with a diameter 43 slightly smaller than the diameter 34 in the wall 32 of the cap 24 and extends through the aperture 34. The stem portion 42 also includes six-sided wrench flats 44. A metal gasket 46 made of a soft malleable metal having opposed principle surfaces 48 and 50 is mounted within the bore 28 and has a diameter 52 larger than the diameter 19 of the knife edge 18. Preferably, the gasket is made of a soft metal such as 1100-TO Aluminum and the cap and plunger are made of 6061-T6 Aluminum alloy. Having all the components of the sealing assembly made of the same basic metal, just different heat treats and alloying elements, extreme temperature changes will not significantly effect the dimensions of the sealing components.

After the tank has been filled, the sealing assembly 22, the cap 24 with the plunger 36 and gasket 46 mounted therein is threaded onto the port 12. The cap 24 is tightened with a wrench, while simultaneously the plunger 36 is prevented from rotating by placement of a second wrench on the wrench flats 44. Thus the surface 40 of the disc shaped member 38 of the plunger 36 is forced into contact with surface 48 of the gasket 46 and the surface 50 thereof is driven into the knife edge 18 without rotation forming a groove 54 therein. With such a seal, it is less likely that any surface imperfections on the surfaces 18 and/or 50 then existing or that would be created if the gasket 46 rotated when being seated, will affect sealing efficiency.

While the invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to valve manufacturing industries.

What is claimed is:

1. A sealing assembly for a port comprising;

the port having a circular shaped end with a circular shaped knife edge at one end thereof;

a hollow cap threadably engagable with the port;

a gasket mounted within said cap having flat first and second principle sides and made of a deformable metal, said gasket having said first side for engaging said circular shaped knife edge of the port;

means to apply only a compression load on said second principle side of said gasket causing said first principle side thereof to be driven into said knife edge of the port sealing off the port, when said cap is threadably engaged with the port.

2. The sealing assembly as set forth in claim 1 wherein said means to apply only a compression load on said gasket causing said one side of said gasket to be driven into said knife edge of the port sealing off said port, when said cap is threadably engaged with the port, comprises:

said cap having a closed first end with an aperture therethrough and an open second end; and a plunger having a circular disc portion adapted to fit within said hollow cap for engaging said second principle side of said gasket and a shaft portion extending out of said aperture, said shaft having wrenching flats thereon;

such that when said cap is threaded onto the port and said plunger is prevented from rotating, said gasket is forced into engagement with said knife edge of the port in a pure compression mode and no rotation of said gasket occurs, thus causing said knife-edge to contact and locally deform said gasket sealing off the port.

3. The sealing assembly as set forth in claim 2 comprising:

said cap having external wrenching flats.

4. The sealing assembly as set forth in claim 3 wherein the port is made of high strength Aluminum Alloy, the sealing assembly comprising:

said plunger and said cap made of high strength Aluminum alloys; and said gasket is made of a low strength Aluminum or Aluminum alloy.

5. The sealing assembly as set forth in claim 1, or 2 or 3, or 4 wherein said knife-edge of the port has an included angle of generally between 140 and 160 degrees.

6. The sealing assembly as set forth in claim 5 wherein said knife-edge of the port has an included angle of 150 degrees.

* * * * *